United States Patent
Fan et al.

(10) Patent No.: US 8,692,932 B2
(45) Date of Patent: Apr. 8, 2014

(54) COMPACT IMAGING DEVICE HAVING A LAMINATED COMPONENT

(75) Inventors: Kin Ming Fan, Kowloon (HK); Man Yee Pang, New Territories (HK); Kwok Sing Cheng, New Territories (HK)

(73) Assignee: Hong Kong Applied Science and Technology Research Institute Co., Ltd., Shatin, New Territories (HK)

( * ) Notice: Subject to any disclaimer, the term of this patent is extended or adjusted under 35 U.S.C. 154(b) by 411 days.

(21) Appl. No.: 12/938,062

(22) Filed: Nov. 2, 2010

(65) Prior Publication Data

US 2011/0298971 A1 Dec. 8, 2011

(51) Int. Cl.
*H04N 5/225* (2006.01)

(52) U.S. Cl.
USPC .......................................... 348/374

(58) Field of Classification Search
USPC ............................. 348/274; 396/55
See application file for complete search history.

(56) References Cited

U.S. PATENT DOCUMENTS

| | | | |
|---|---|---|---|
| 7,612,957 B1 | 11/2009 | Wu et al. | |
| 7,683,960 B2 * | 3/2010 | Minami et al. | 348/340 |
| 2007/0188868 A1 * | 8/2007 | Fujinaka et al. | 359/557 |
| 2007/0242152 A1 * | 10/2007 | Chen | 348/345 |
| 2008/0037143 A1 | 2/2008 | Yoon | |
| 2008/0098587 A1 | 5/2008 | Mitsui et al. | |
| 2009/0015706 A1 | 1/2009 | Singh | |
| 2011/0013063 A1 * | 1/2011 | Yamamoto et al. | 348/294 |
| 2011/0096419 A1 * | 4/2011 | Matsuo et al. | 359/820 |
| 2011/0199530 A1 * | 8/2011 | Kosaka et al. | 348/340 |
| 2011/0299181 A1 * | 12/2011 | Pang et al. | 359/824 |

OTHER PUBLICATIONS

Application as filed in co-pending matter U.S. Appl. No. 12/510,924, filed Jul. 28, 2009, 96 pages.
Office Action in co-pending matter U.S. Appl. No. 12/510,924, Mailed Jun. 10, 2010, 15 pages.
Response to Office Action in co-pending matter U.S. Appl. No. 12/510,924, filed Sep. 7, 2010, 11 pages.
Office Action in co-pending matter U.S. Appl. No. 12/510,924, Mailed Oct. 19, 2010, 12 pages.

* cited by examiner

*Primary Examiner* — Gary C Vieaux
(74) *Attorney, Agent, or Firm* — Berkeley Law & Technology Group, LLP

(57) ABSTRACT

The subject matter disclosed herein relates to an imaging device including a laminated portion of an actuator or actuator support.

8 Claims, 11 Drawing Sheets

COMPACT IMAGING DEVICE HAVING A LAMINATED COMPONENT

FIELD

The subject matter disclosed herein relates to an imaging device including a laminated portion of an actuator or actuator support.

BACKGROUND

Many portable electronic apparatuses, such as a cellular phone and/or a personal digital assistant (PDA) for example, may comprise a compact camera module. Such a module may comprise an image sensor, an imaging lens assembly, and/or an actuator to adjust the position of the imaging lens assembly with respect to the image sensor. As designers push towards slimmer, smaller, and/or lighter portable electronic apparatuses, compact camera module manufacturers, among others, are facing a challenge of providing smaller compact camera modules that can fit into limited space of the apparatuses. In addition, a push towards increasingly lower manufacturing costs persists for compact camera modules having ever-increasing performance.

BRIEF DESCRIPTION OF THE DRAWINGS

Non-limiting and non-exhaustive embodiments will be described with reference to the following objects, wherein like reference numerals refer to like parts throughout the various objects unless otherwise specified.

DETAILED DESCRIPTION

Figure 1:
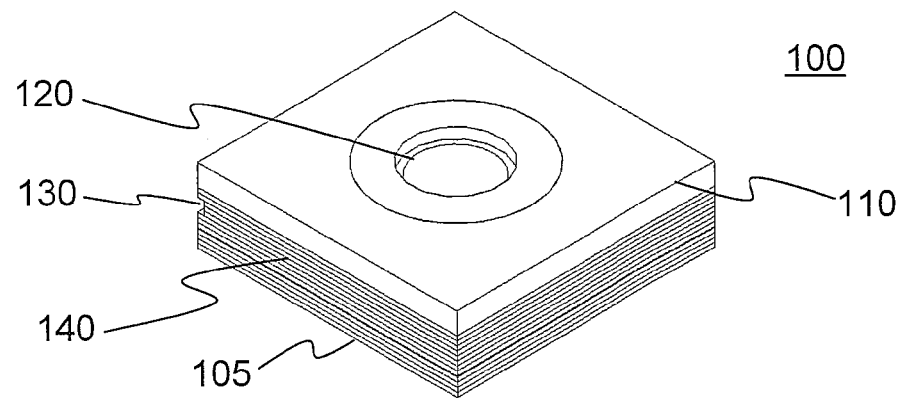
FIG. 1 is a perspective view of a portion of a compact imaging module, according to an embodiment.

In the following detailed description, numerous specific details are set forth to provide a thorough understanding of claimed subject matter. However, it will be understood by those skilled in the art that claimed subject matter may be practiced without these specific details. In other instances, methods, apparatuses, or systems that would be known by one of ordinary skill have not been described in detail so as not to obscure claimed subject matter.

Reference throughout this specification to "one embodiment" or "an embodiment" may mean that a particular feature, structure, or characteristic described in connection with a particular embodiment may be included in at least one embodiment of claimed subject matter. Thus, appearances of the phrase "in one embodiment" or "an embodiment" in various places throughout this specification are not necessarily intended to refer to the same embodiment or to any one particular embodiment described. Furthermore, it is to be understood that particular features, structures, or characteristics described may be combined in various ways in one or more embodiments. In general, of course, these and other issues may vary with the particular context of usage. Therefore, the particular context of the description or the usage of these terms may provide helpful guidance regarding inferences to be drawn for that context.

Likewise, the terms, "and," "and/or," and "or" as used herein may include a variety of meanings that also is expected to depend at least in part upon the context in which such terms are used. Typically, "or" as well as "and/or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe some combination of features, structures, or characteristics. Though, it should be noted that this is merely an illustrative example and claimed subject matter is not limited to this example.

As used to describe embodiments herein, terms "above", "below", "upper", "lower", and "side" describe positions relative to an optical axis of such a compact imaging module. In particular, "above" and "below" refer to positions along an optical axis, wherein "above" refers to one side of an element and "below" refers to an opposite side of the element. Relative to such an "above" and "below", "side" refers to a side of an element that is displaced from an optical axis, such as the periphery of a lens, for example. Further, it is understood that such terms do not necessarily refer to a direction defined by gravity or any other particular orientation. Instead, such terms are merely used to identify one portion versus another portion. Accordingly, "upper" and "lower" may be equivalently interchanged with "top" and "bottom", "first" and "second", "right" and "left", and so on.

Embodiments described herein include a compact imaging module that provides a mechanism and/or allows a process to adjust a distance between an imaging lens and an image sensor. As described in detail below, particular features of a compact imaging module may provide an advantage to designers incorporating such a module into increasingly slimmer, smaller, and/or lighter portable electronic apparatuses, such as a compact camera, for example.

A compact imaging module, such as a compact camera module, may provide auto-focus and/or other imaging functions. In a particular embodiment, a structure of such a compact camera module may include one or more portions that comprise laminated components. For example, one or more portions of an actuator may comprise laminated components. In one implementation, such an actuator may comprise a magnet and a coil to impart a magnetic force on a lens assembly. Such a magnet and/or coil may be positioned in a holder that may comprise a laminated holder, as described below. In any case, such a magnet may have a flat or planar shape, such as the shape of a flat disk, for example. Such a magnet may comprise a permanent magnet or electromagnetic field generator, such as a coil, for example. Such a coil may be a wound coil, printed coil, and/or an electroplated coil on a substrate. A compact imaging module may comprise one or more springs to provide a restoring force to the lens assembly.

In other embodiments, a compact imaging module may include an actuator having a coil that moves with a lens assembly while the coil is energized, while a magnet is stationary with respect to an image sensor. In another configuration, a compact imaging module may comprise an actuator having a coil and a magnet, wherein the magnet may move with a lens assembly if the coil is energized, while the coil remains stationary.

In one particular implementation, such an actuator may comprise one or more magnets arranged in a plane. In another particular implementation, such an actuator may comprise one or more coils arranged in a plane. Such coils may be electrically connected in series and/or parallel, for example. In another particular implementation, such coils may be mounted on and/or sit on a lens assembly of a compact imaging module.

In another embodiment, a compact imaging module may include an actuator comprising at least two sets of coils to produce an electromagnetic force, wherein each set of coils is positioned in two parallel planes. In one particular implementation, such two sets of coils may be arranged substantially orthogonal to an optical axis of a lens assembly of the compact imaging module. In another particular implementation, one set of the two sets of coils may move with the lens assembly if the two sets of coils are energized, for example. Of course, such details of a compact imaging module are merely examples, and claimed subject matter is not so limited.

In an embodiment, a compact imaging module may result from mounting and/or coupling a lens assembly including one or more lenses to a portion of an actuator, and positioning an image sensor to receive light via the lens assembly. The actuator may include one or more leaf springs that are between the image sensor and the lens assembly, and one or more leaf springs that are between a coil and a magnet of the actuator. In an implementation, via a stationary support (with respect to the image sensor), a magnet of the actuator may be mounted to the image sensor while the PCB coil is rigidly attached to the lens assembly. As mentioned above, such an actuator may drive a lens assembly vertically to adjust the position of the lens assembly with respect to an image sensor. As used herein, "vertically" refers to a direction substantially parallel to an optical axis of a compact imaging module, whereas "horizontally" refers to a direction substantially in a plane which is perpendicular to an optical axis of a compact imaging module. Of course, such details of a compact imaging module are merely examples, and claimed subject matter is not so limited.

An actuator may provide a relatively precise control of motion of a lens assembly, so that various imaging functions, such as focusing for example, may lead to improved image quality. An advantage of such a compact module is that its footprint may be substantially equal to or smaller than a footprint of an image sensor, so that a surface area of the compact module does not extend substantially beyond a surface area of the image sensor, though claimed subject matter is not so limited. Moreover, a batch manufacturing process may be applied to fabricating at least portions of such a compact module. For example, such a batch process may comprise a wafer level process to fabricate laminated portions of an actuator of a compact image sensor, such as laminated spacers, laminated magnet holders, laminated coil holders, and so on. Such a process may lead to a relatively high manufacturing efficiency, thus lowering manufacturing costs of a camera, for example, due to a focus variation function provided by the compact module. Batch process may refer to one or more manufacturing techniques of creating a group of components at a workstation before moving the group to a next step in production. For example, one or more laminated layers may contain numerous individual units. By assembling a laminated structure, such numerous individual units may be formed at the same time. Accordingly, after a process of singulation, relatively many individual units may be produced from one laminated structure, for example.

Figure 2:
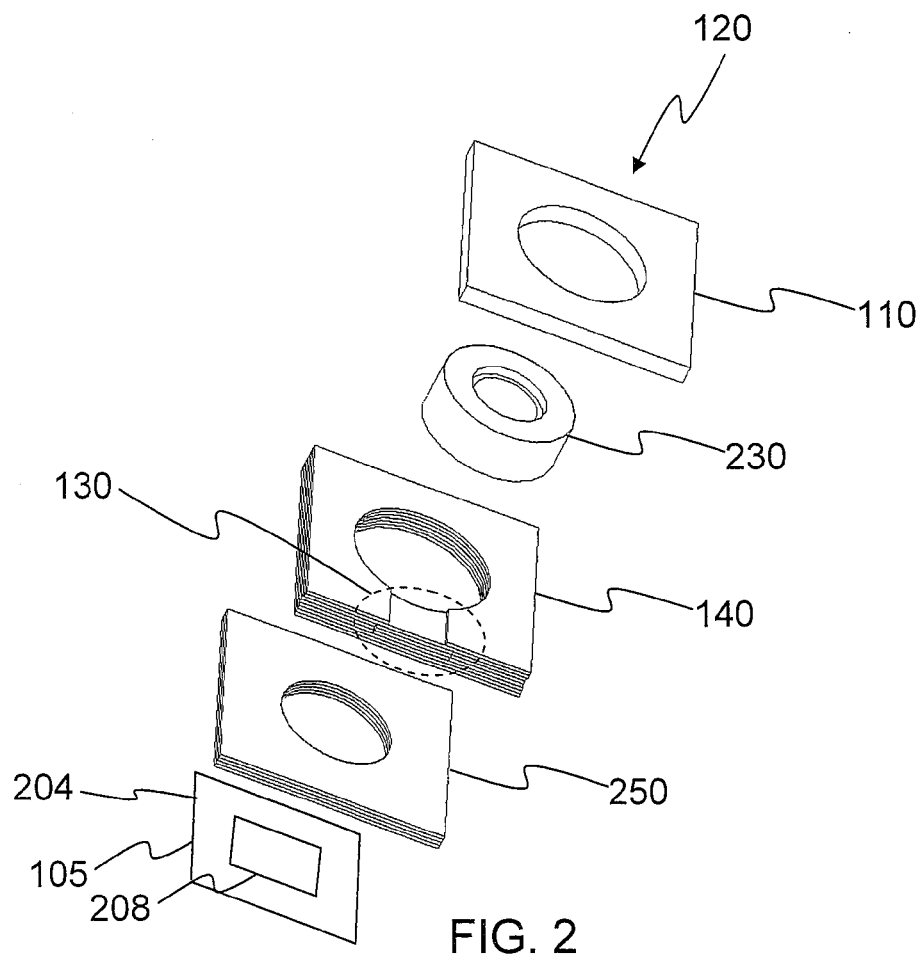
FIG. 2 is a perspective view of components that comprise a compact imaging module, according to an embodiment.

FIG. 1 is a perspective view of a portion of a compact imaging module 100 and FIG. 2 is a perspective view of components that may comprise compact imaging module 100, according to an embodiment. Such an imaging module may comprise an image sensor 105 including an active region 208 of an array of pixilated charge-coupled devices (CCD) and/or one or more complementary metal-oxide-semiconductor (CMOS) devices, just to name a couple of examples. Image sensor 105 may also comprise an inactive region 204 at least partially surrounding active region 208. Inactive region 204 may comprise a border or frame for active region 208, and may be used to physically support other portions of compact imaging module 100 without interfering with light impinging on active region 208. For example, a portion of actuator 110 (discussed below) may be mounted and/or coupled to inactive region 204 of image sensor 105 via a bottom spacer 250, though claimed subject matter is not so limited.

In an embodiment, imaging module 100 may further comprise a lens assembly 230, which may include one or more lenses to project an image onto active region 208 of image sensor 105. Aperture 120 may receive light into lens assembly 230. Such an image need not comprise visible wavelengths, but may also comprise infrared and/or ultraviolet wavelengths, for example. So that such an image may be focused onto active region 108, actuator 110 may adjust a position of lens assembly 230 with respect to image sensor 105. In a particular implementation, actuator 110 may adjust a vertical position of at least a portion of lens assembly 230 with respect to image sensor 105. As mentioned above, such a lens assembly may comprise one or more lenses so that the vertical position of one or more of such lenses may be adjusted as a group. In a particular implementation, imaging module 100 may further comprise a laminated bottom spacer 250 and/or a laminated middle spacer 140. Such laminated spacers may comprise two or more relatively thin laminating sheets of any or a combination of various materials. Different laminating sheets may have patterns, shapes, and/or thickness the same or different from one another. As an example, particular variations of patterns of laminating layers forming laminated middle spacer 140 may result in a three-dimensional notch-like feature 130. Of course, such details of imaging module 100 are merely examples, and claimed subject matter is not so limited.

Figure 3:
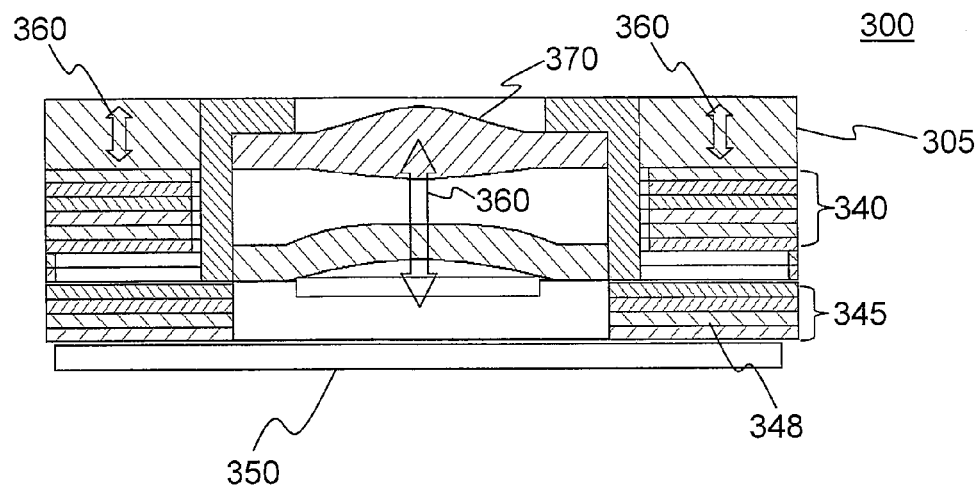
FIG. 3 is a cross-section view of components that comprise a compact imaging module, according to an embodiment.

FIG. 3 is a cross-section view of components that comprise a compact imaging module 300, according to an embodiment. For example, such a compact imaging module may be similar to imaging module 100 shown in FIG. 1. Compact imaging module 300 may comprise an image sensor 350, which may be similar to image sensor 105 shown in FIG. 1, for example. Imaging module 300 may further comprise a lens assembly 370 to provide an image onto an active region, such as active region 208 shown in FIG. 1 for example, of image sensor 350. Actuator 305 may adjust a position of lens assembly 370 with respect to image sensor 350 to focus an image onto image sensor 350. A direction of such positioning is depicted by arrow 360, for example. As mentioned above, lens assembly 370 may comprise one or more lenses, and the vertical position of one or more such lenses may be adjusted as a group by actuator 305. In a particular implementation, compact imaging module 300 may further comprise a laminated bottom spacer 345 and/or a laminated middle spacer 340. Such laminated spacers may comprise two or more laminating sheets of any or a combination of various materials. For example, laminated bottom spacer 345 includes laminating sheet 348, which may comprise metal, fiberglass, plastic, and ceramic, just to name a few examples. Different laminating sheets may have patterns, shapes, and/or thickness the same or different from one another. Of course, such details of imaging module 100 are merely examples, and claimed subject matter is not so limited.

Figure 4:
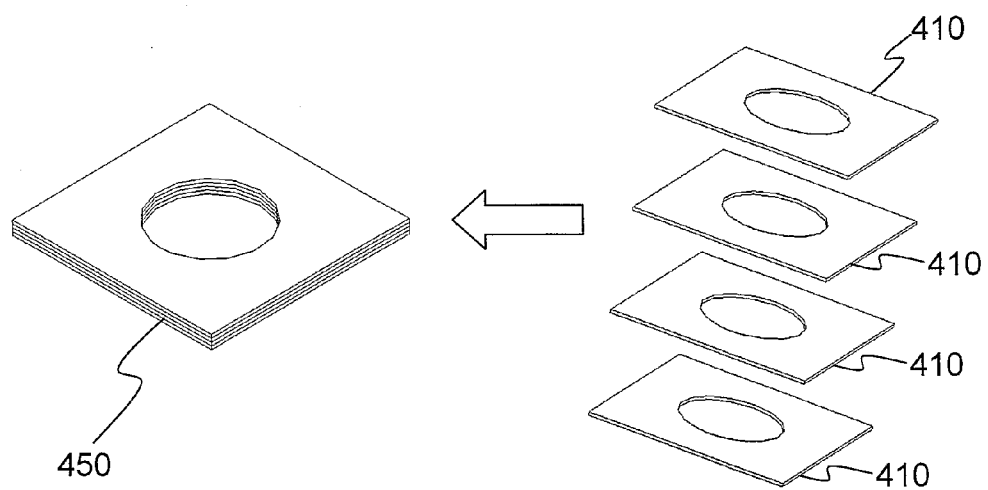
FIG. 4 is a perspective view of layers that comprise a laminated bottom spacer, according to an embodiment.

FIG. 4 is a perspective view of layers 410 that comprise a laminated bottom spacer 450 of a compact imaging module, according to an embodiment. A pattern and/or thickness of individual layers may be varied and arranged to form a three-dimensional structure. Benefits of fabricating a laminated spacer (e.g., bottom and/or middle spacer) or any other component included in a compact imaging module include an ability to change materials of various laminating layers for various considerations, such as heat transfer, electrical conduction, and/or weight reduction, and so on. Another benefit includes the fact that laminating techniques may involve relatively low cost while achieving relatively high accuracy, a relatively high degree of flatness and relatively fine, small-scale features. In a particular example, referring to FIG. 4, laminated bottom spacer may comprise three laminating layers of 0.16 mm stainless steel sheet having patterns that are the same with one another. Of course, such details of laminated bottom spacer 450 are merely examples, and claimed subject matter is not so limited.

Figure 5:
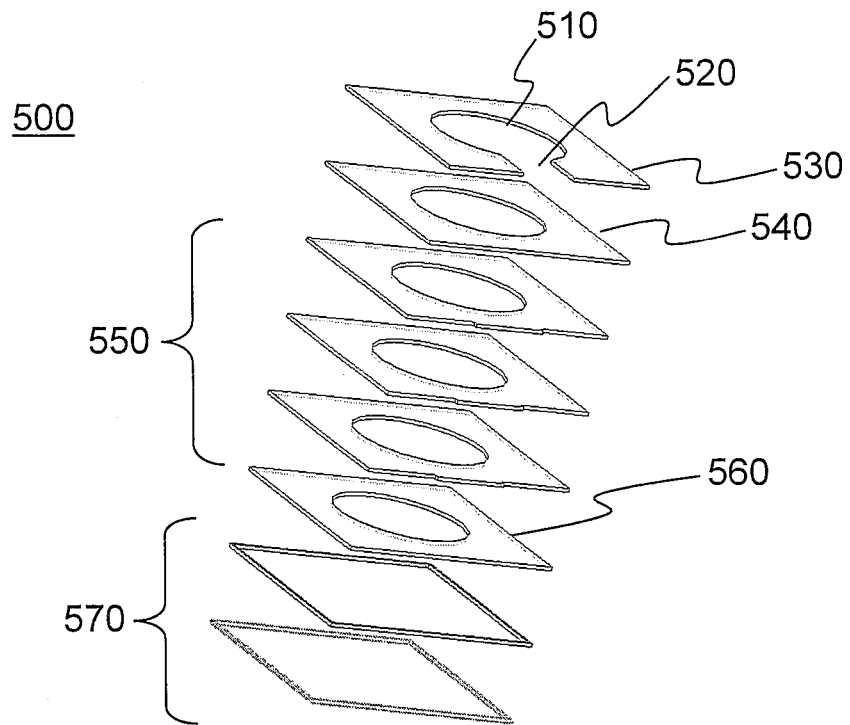
FIG. 5 is a perspective view of layers that comprise a laminated middle spacer, according to an embodiment.
Figure 6:
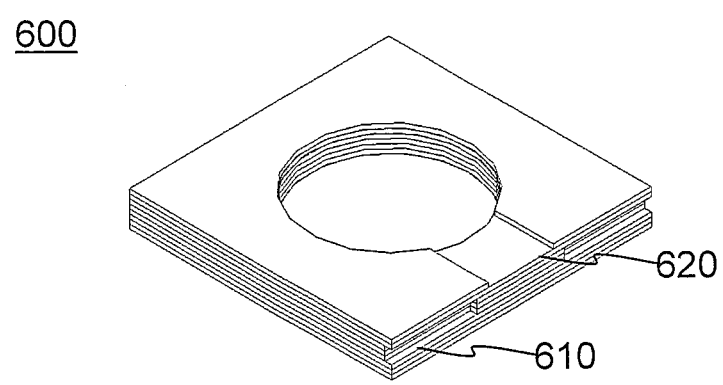
FIG. 6 is a perspective view of a laminated middle spacer, according to an embodiment.

FIG. 5 is a perspective view of laminating layers 500 that comprise a laminated middle spacer 600 of a compact imaging module, shown in FIG. 6, according to an embodiment. A pattern and/or thickness of individual layers may be varied and arranged to form a three-dimensional structure, including a recessed region 620, for example. The following description of individual laminating layers that comprise laminated middle spacer 600 is intended to demonstrate that such laminated components of a compact imaging module may comprise any number of various patterns, shapes, sizes, materials, thicknesses, and so on. It is to be understood, of course, that details of the following description of laminating layers are merely examples, and claimed subject matter is not so limited. Laminating layers 500 may include a first laminating layer 530 having a peripheral opening 520 in addition to aperture 510 to provide an optical path. Such a peripheral opening 520, for example, may result in notch-like feature 620. A second laminating layer 540 may be similar to first laminating layer 530 except for a lack of a peripheral opening. A first group of laminating layers 550 may include one or more (e.g., four in FIG. 5) laminating layers having a tab, for example, protruding from a periphery of the one or more laminating layers. An additional laminating layer 560 need not include such a tab, for example. A second group of laminating layers 570 may include one or more (e.g., two in FIG. 5) laminating layers that comprise a relatively large opening compared to the previously-described laminating layers, for example. Accordingly, assembling (e.g. using lamination techniques) laminating layers 530, 540, 550, 560, and 570 may result in laminated middle spacer 600, which may include three-dimensional features such as recessed regions 610 and 620.

Figure 7:
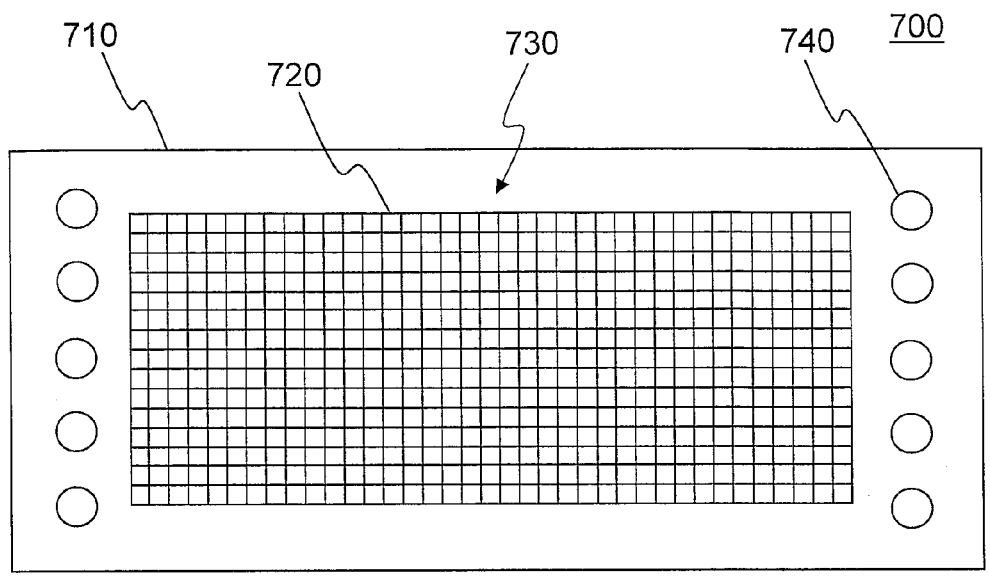
FIG. 7 is a top view of a laminating layer for a laminated magnet holder, according to an embodiment.

FIG. 7 is a top view of a laminating layer 700 that may be used in a batch process assembly of laminated magnet holders (to be described in further detail below), according to an embodiment. As explained below, such a laminating layer may be combined with one or more additional laminating layers, which may be identical or different from one another, to form a plurality of individual laminated magnet holders. Laminating layer 700 may comprise any number and/or combination of materials 710, such as metal, fiberglass, plastic, ceramic, and so on, as mentioned above. Laminating layer 700 may comprise alignment and/or register holes 740 to align two or more such laminating layers (which, again, may have different patterns, thicknesses, and so on) during a process of lamination. Laminating layer 700 may comprise multiple magnet holder laminating layers 720 that may be arranged in an array 730. Though laminating layer 700 is described here as comprising laminating layers for magnet holders, such a laminating layer may be used for batch process assembly of other laminated components of a compact imaging module, such as laminated spacers, laminated coil holders (to be described in further detail below), and so on.

Figure 8:
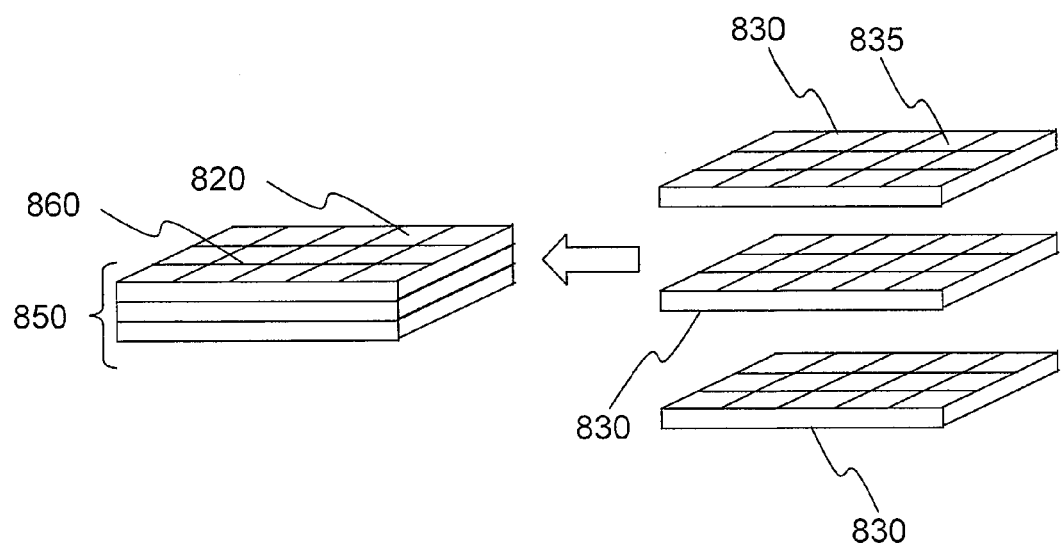
FIG. 8 is a perspective view of laminating layers for a laminated magnet holder, according to an embodiment.

FIG. 8 is a perspective view of laminating layers 830 for a laminated magnet holder fabricated in a batch process, according to an embodiment. For example, such laminating layers may comprise at least portions of the array 730 of magnet holders shown in FIG. 7. Laminating layers 830 may comprise an array of magnet holder laminating layers 835. During assembly of magnet holders using a batch process, for example, layers 830 may be lined up relative to one another and laminated together to form an array 850 of individual laminated magnet holders. Subsequent to being lined up, some alignment holes 740 may appear for each laminated layer at the same corresponding position. For an assembly process, adhesive may be added to a laminated layer and then the laminated layer may be placed into a jig with some protrusions that guide the alignment holes of the laminated layer. Another laminated layer, which need not include adhesive, may be placed on the top of the first laminated layer. In one implementation, a mass may be added on top of the assembly of laminated layers to apply pressure to the laminated layers to improve adhesion. Subsequently, such individual laminated magnet holders 820 may be separated from one another by cutting substantially along edges 860 of the individual laminated magnet holders 820. Subsequently, though not shown, separated laminated magnet holders 820 may be assembled into actuators and/or other portions of compact image modules. Of course, such details of a fabricating process of a compact imaging module are merely examples, and claimed subject matter is not so limited.

As mentioned above, benefits of fabricating a laminated component included in a compact imaging module include an ability to change materials of various laminating layers for various considerations, such as heat transfer, electrical conduction, and/or weight reduction, and so on. Another benefit may include the fact that fabricating laminated components may be readily performed using batch processing fabrication techniques, as discussed above. Yet another benefit includes the fact that laminating techniques may involve relatively low cost while achieving relatively high precision, a relatively high degree of flatness and relatively fine, small-scale features. In contrast, fabricating components using etching techniques may result in undesirable undercutting, over-etching, under-etching, or other etching inaccuracies of various portions of the components. As another example, fabricating components using laser cutting techniques may result in cutting inaccuracies of various portions of the components. Such inaccuracies may result from convergence and/or divergence of a laser beam, even though the laser beam may be focused on a portion of the component to be cut. For example, a relatively thick portion to be cut may experience varying laser beam diameters. Further, a relatively thick portion to be cut may experience uneven heating from the laser beam, resulting in thermal stress that may lead to dimensional changes of the cut portion. Accordingly, fabricating laminated components may result in relatively high dimensional accuracy, relative flatness, an ability to fabricate relatively fine thin wall structures, and so on. Of course, such benefits of fabricating a laminated component are merely examples, and claimed subject matter is not so limited.

Figure 9:
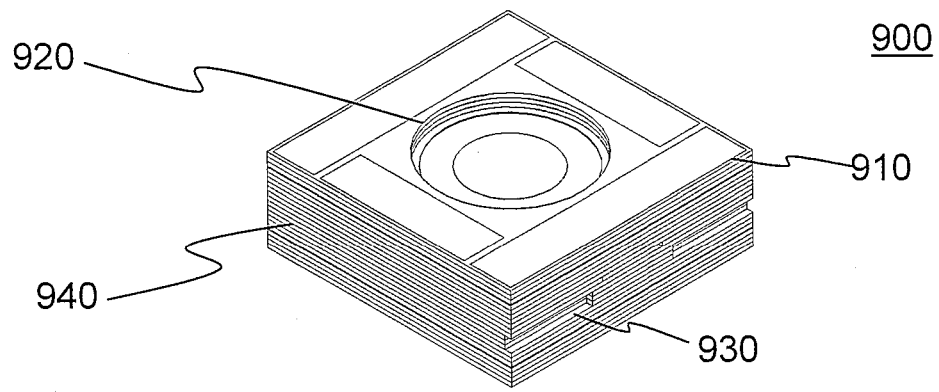
FIG. 9 is a perspective view of a compact imaging module, according to another embodiment.
Figure 10:
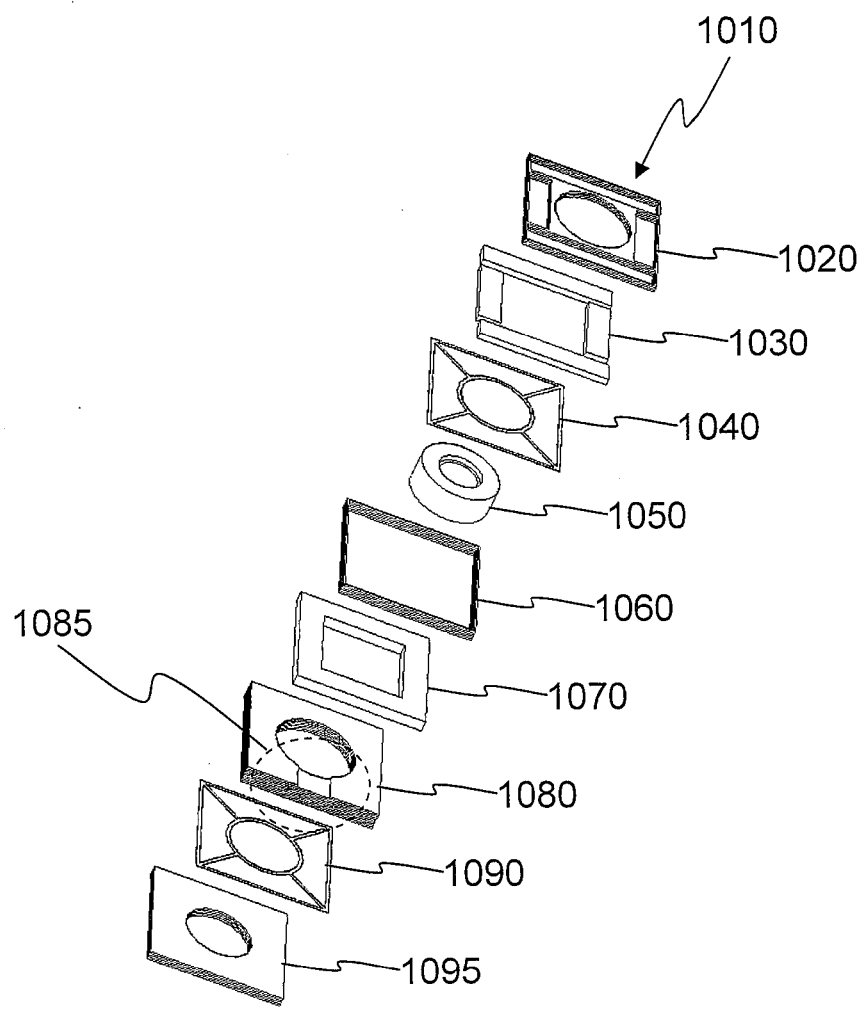
FIG. 10 is a perspective view of components that comprise a compact imaging module, according to another embodiment.

FIG. 9 is a perspective view of a compact imaging module 900, according to another embodiment. Such a compact imaging module may comprise a laminated magnet holder 910 and a laminated coil holder 940. Aperture 920 may receive light into lens assembly 1050 (FIG. 10). As mentioned above, incorporating laminated layers in a compact imaging module may provide an opportunity to include three-dimensional features 900, which may comprise grooves, notches, slits, recessed regions, bumps, ridges, and so on.

FIG. 10 is a perspective view of components that may comprise compact imaging module 900, according to an embodiment. Such a compact imaging module may comprise an image sensor such as image sensor 105 shown in FIG. 2, for example. Compact imaging module 900 may further comprise a lens assembly 1050, which may include one or more lenses to project an image onto an image sensor. Aperture 1010 may receive light into lens assembly 1050 and other components of compact imaging module 900. Such an image need not comprise visible wavelengths, but may also comprise infrared and/or ultraviolet wavelengths, for example. So that such an image may be focused onto an image sensor, an actuator may adjust a position of lens assembly 1050 with respect to an image sensor. In a particular implementation, such an actuator may adjust a vertical position of at least a portion of lens assembly 1050 with respect to an image sensor. In an implementation, such an actuator may comprise a magnet 1030, a laminated magnet holder 1020, a spring 1040, a coil 1070, and/or a laminated coil holder 1060. Laminated magnet holder 1020 may comprise a substantially planar holder that provides an area and/or space to accommodate one or more magnets 1030. Laminated coil holder 1060 may comprise a substantially planar holder that provides an area and/or space to accommodate coil 1070. Such laminated magnet holder and/or laminated coil holder may comprise two or more laminating layers, as described above, for example. Electrical leads (not shown) may provide electrical signals to coil 1070. Such leads may comprise a flexible conductor, such as a ribbon, one or more wires, and so on. Though magnet 1030 is shown in FIG. 10 to include four portions, claimed subject matter is not so limited. Also, a magnet holder or coil holder, whether laminated or not, need not be included in an embodiment of an imaging module. Imaging module 900 may further comprise a laminated middle spacer 1080 disposed between spring 1090 and a laminated bottom spacer 1095, for example. As mentioned above, different laminating sheets of laminated spacers 1080 and 1095 may have patterns, shapes, and/or thickness the same or different from one another. As an example, particular variations of patterns of laminating layers foaming laminated middle spacer 1080 may result in a notch-like feature 1085. Of course, such details of compact imaging module are merely examples, and claimed subject matter is not so limited.

Figure 11:
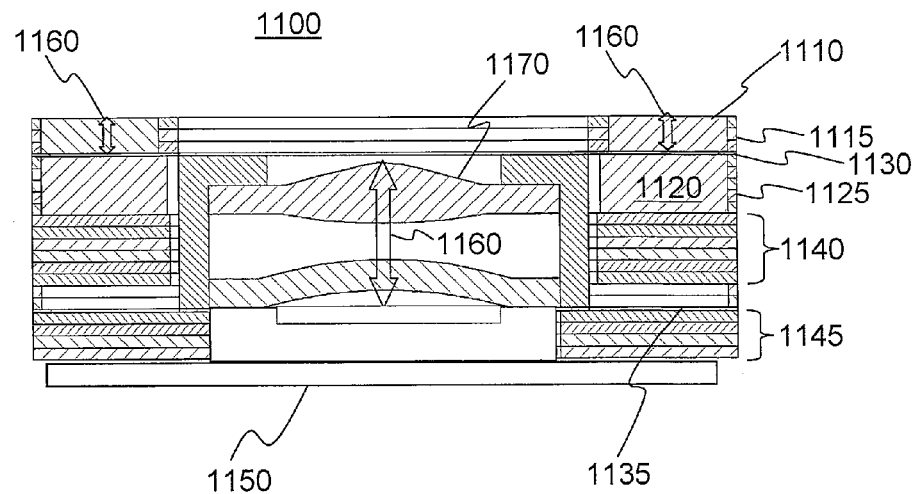
FIG. 11 is a cross-section view of components that comprise a compact imaging module, according to another embodiment.

FIG. 11 is a cross-section view of components that comprise a compact imaging module 1100, according to another embodiment. Such a compact imaging module may comprise an image sensor 1150 and a lens assembly 1170 to provide an image onto image sensor 1150. An actuator may adjust a position of lens assembly 1170 with respect to image sensor 1150 to focus an image onto image sensor 1150. A direction of such positioning is depicted by arrow 1160, for example. As mentioned above, lens assembly 1170 may comprise one or more lenses, and the vertical position of one or more such lenses may be adjusted as a group by an actuator. In an implementation, such an actuator may comprise a magnet 1110, a laminated magnet holder 1115, a planar spring 1130, a coil 1120, and/or a laminated coil holder 1125. Laminated magnet holder 1115 may comprise a substantially planar holder that provides an area and/or space to accommodate one or more magnets 1110. Laminated coil holder 1125 may comprise a substantially planar holder that provides an area and/or space to accommodate coil 1120. Such laminated magnet holder and/or laminated coil holder may comprise two or more laminating layers, as described above, for example. Responsive to actuator movements, magnet 1110 and magnet holder 1115 may move with lens assembly 1170 substantially in a direction indicated by arrows 1160. In a particular implementation, planer spring 1130 may comprise a portion (e.g., a circumferential portion) attached to a portion of coil 1120 and/or coil holder 1125. Another portion (e.g., a central portion) of planar spring 1130 may be attached to a portion of magnet 1110 and/or magnet holder 1115 to form a movable part. Imaging module 1100 may further comprise a laminated middle spacer 1140 disposed between a bottom spring 1135 and coil 1120. Further, imaging module 1100 may comprise a laminated bottom spacer 1145 disposed between bottom spring 1135 and image sensor 1150. As mentioned above, different laminating sheets of laminated bottom spacer 1145, laminated middle spacer 1140, laminated coil holder 1125, and/or laminated magnet holder 1115 may have patterns, shapes, and/or thickness the same or different from one another. Of course, such details of compact imaging module 1100 are merely examples, and claimed subject matter is not so limited.

Figure 12:
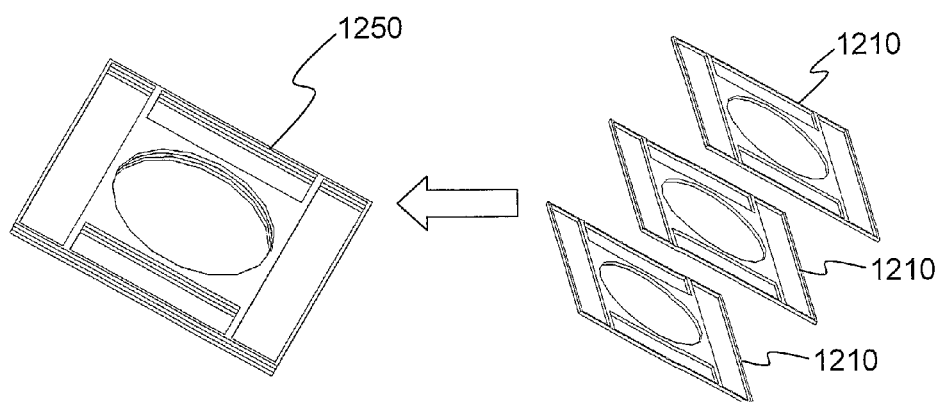
FIG. 12 is a perspective view of layers that comprise a laminated magnet holder, according to an embodiment.

FIG. 12 is a perspective view of layers 1210 that comprise a laminated magnet holder 1250, according to an embodiment. Such a magnet holder may be similar to laminated magnet holder 1150 shown in FIG. 11, for example. In a particular implementation, laminating layers 1210 may comprise 0.16 mm stainless steel sheets having a pattern substantially the same as one another. In another particular implementation, laminating layers 1210 may comprise stainless steel sheets having a range of thicknesses between 0.1 and 0.2 min with patterns different from or substantially the same as one another. As discussed above, laminating layers 1210 may be laminated together in a batch process, though claimed subject matter is not so limited.

Figure 13:
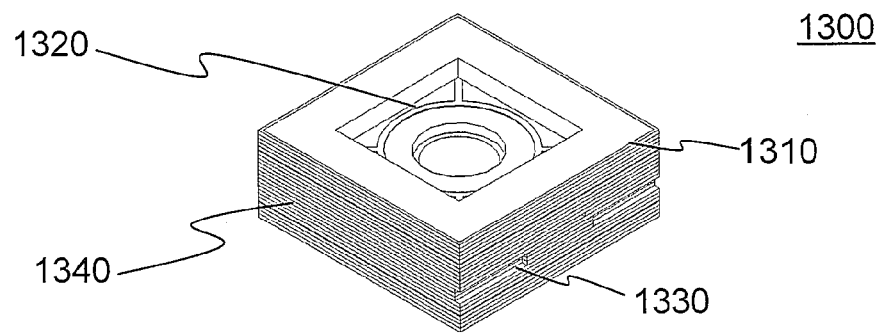
FIG. 13 is a perspective view of a compact imaging module, according to another embodiment.
Figure 14:
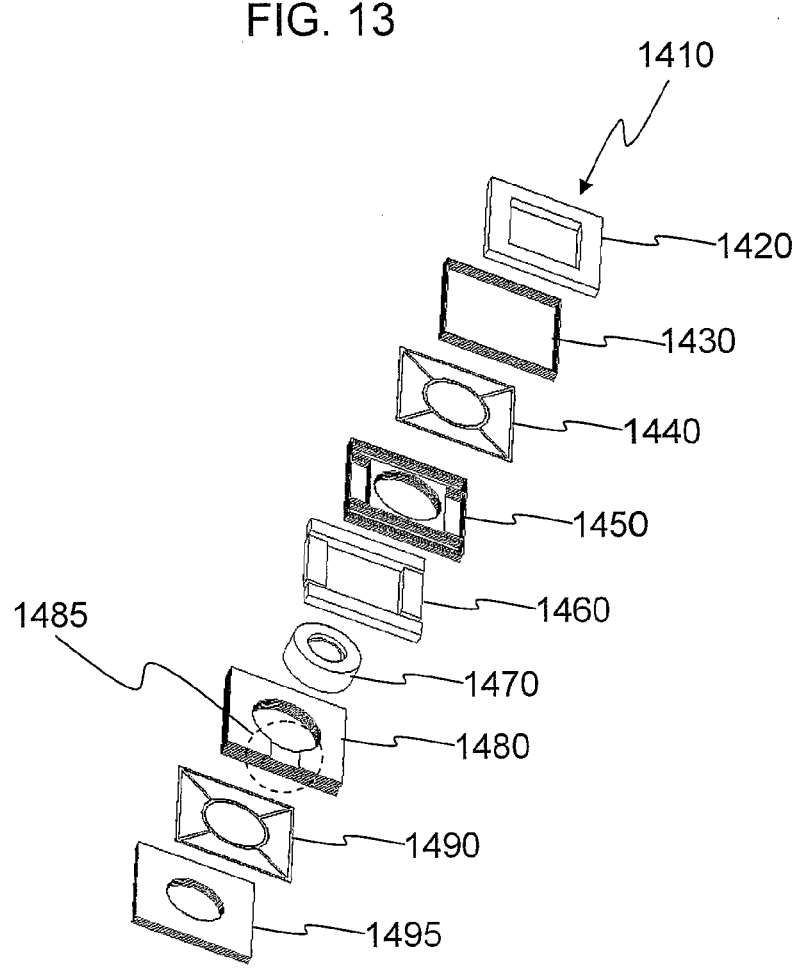
FIG. 14 is a perspective view of components that comprise a compact imaging module, according to another embodiment.

FIG. 13 is a perspective view of a compact imaging module 1300, according to another embodiment. Such a compact imaging module may comprise a laminated coil holder 1310 and a laminated magnet holder 1340. Aperture 1320 may receive light into lens assembly 1470 (FIG. 14). As mentioned above, incorporating laminated layers in a compact imaging module may provide an opportunity to include three-dimensional features 1330, which may comprise grooves, notches, slits, recessed regions, bumps, ridges, and so on.

FIG. 14 is a perspective view of components that may comprise compact imaging module 1300, according to an embodiment. Such a compact imaging module may comprise an image sensor such as image sensor 105 shown in FIG. 2, for example. Compact imaging module 1300 may further comprise a lens assembly 1470, which may include one or more lenses to provide an image onto an image sensor. Aperture 1410 may receive light into lens assembly 1470 and other components of compact imaging module 1300. So that such an image may be focused onto an image sensor, an actuator may adjust a position of lens assembly 1470 with respect to an image sensor. In a particular implementation, such an actuator may adjust a vertical position of at least a portion of lens assembly 1470 with respect to an image sensor. In an implementation, such an actuator may comprise a magnet 1460, a laminated magnet holder 1450, a spring 1440, a coil 1420, and/or a laminated coil holder 1430. Laminated magnet holder 1450 may comprise a substantially planar holder that provides an area and/or space to accommodate one or more magnets 1460. Laminated coil holder 1430 may comprise a substantially planar holder that provides an area and/or space to accommodate coil 1420. Such laminated magnet holder and/or laminated coil holder may comprise two or more laminating layers, as described above, for example. Electrical leads (not shown) may provide electrical signals to coil 1420. Such leads may comprise a flexible conductor, such as a ribbon, one or more wires, and so on. Though magnet 1460 is shown in FIG. 14 to include four portions, claimed subject matter is not so limited. Also, a magnet holder or coil holder, whether laminated or not, need not be included in an embodiment of an imaging module. Imaging module 1300 may further comprise a laminated middle spacer 1480 disposed between spring 1490 and a laminated bottom spacer 1495, for example. As mentioned above, different laminating sheets of laminated spacers 1490 and 1095 may have patterns, shapes, and/or thickness the same or different from one another. As an example, particular variations of patterns of laminating layers forming laminated middle spacer 1480 may result in a notch-like feature 1485. Of course, such details of compact imaging module are merely examples, and claimed subject matter is not so limited.

Figure 15:
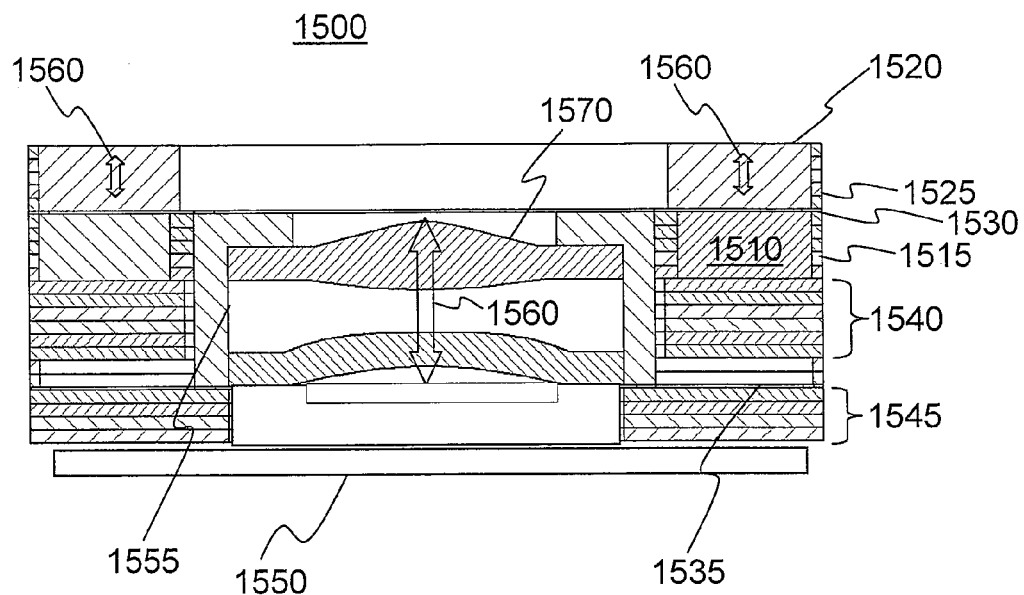
FIG. 15 is a cross-section view of components that comprise a compact imaging module, according to another embodiment.

FIG. 15 is a cross-section view of components that comprise a compact imaging module 1500, according to another embodiment. Such a compact imaging module may comprise an image sensor 1550 and a lens assembly 1570 to project an image onto image sensor 1550. An actuator may adjust a position of lens assembly 1570 with respect to image sensor 1550 to focus an image onto image sensor 1550. A direction of such positioning is depicted by arrow 1560, for example. As mentioned above, lens assembly 1570 may comprise one or more lenses, and the vertical position of one or more such lenses may be adjusted as a group by an actuator. In an implementation, such an actuator may comprise a magnet 1510, a laminated magnet holder 1515, a planar spring 1530, a coil 1520, and/or a laminated coil holder 1525. Laminated magnet holder 1515 may comprise a substantially planar holder that provides an area and/or space to accommodate one or more magnets 1510. Laminated coil holder 1525 may comprise a substantially planar holder that provides an area and/or space to accommodate coil 1520. Such laminated magnet holder and/or laminated coil holder may comprise two or more laminating layers, as described above, for example. Responsive to actuator movements, coil 1520 and coil holder 1525 may move with lens assembly 1570 substantially in a direction indicated by arrows 1560. In a particular implementation, planer spring 1530 may comprise a portion (e.g., a circumferential portion) attached to a portion of magnet holder 1525. Another portion (e.g., a central portion) of planar spring 1530 may be attached to a portion of coil 1520 and/or coil holder 1515 to form a movable part. Imaging module 1500 may further comprise a laminated middle spacer 1540 disposed between a bottom spring 1535 and magnet 1510. Further, imaging module 1500 may comprise a laminated bottom spacer 1545 disposed between bottom spring 1535 and image sensor 1550. As mentioned above, different laminating sheets of laminated bottom spacer 1545, laminated middle spacer 1540, laminated coil holder 1525, and/or laminated magnet holder 1515 may have patterns, shapes, and/or thickness the same or different from one another. Of course, such details of compact imaging module 1500 are merely examples, and claimed subject matter is not so limited.

Figure 16:
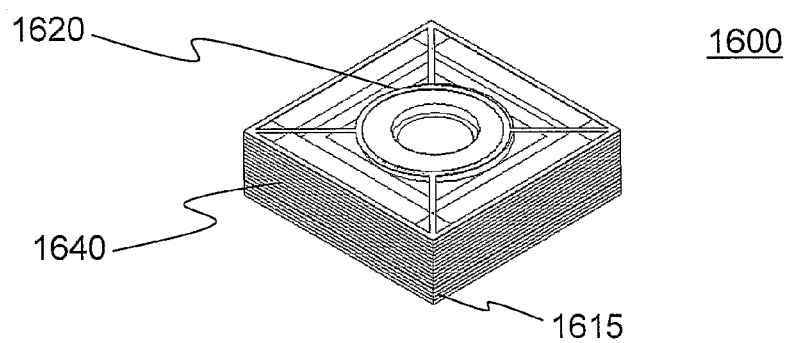
FIG. 16 is a perspective view of a compact imaging module, according to yet another embodiment.

FIG. 16 is a perspective view of a compact imaging module 1600, according to another embodiment. Such a compact imaging module may comprise a laminated magnet holder 1640 and a laminated bottom spacer 1615. Aperture 1620 may receive light into lens assembly 1760 (FIG. 17).

Figure 17:
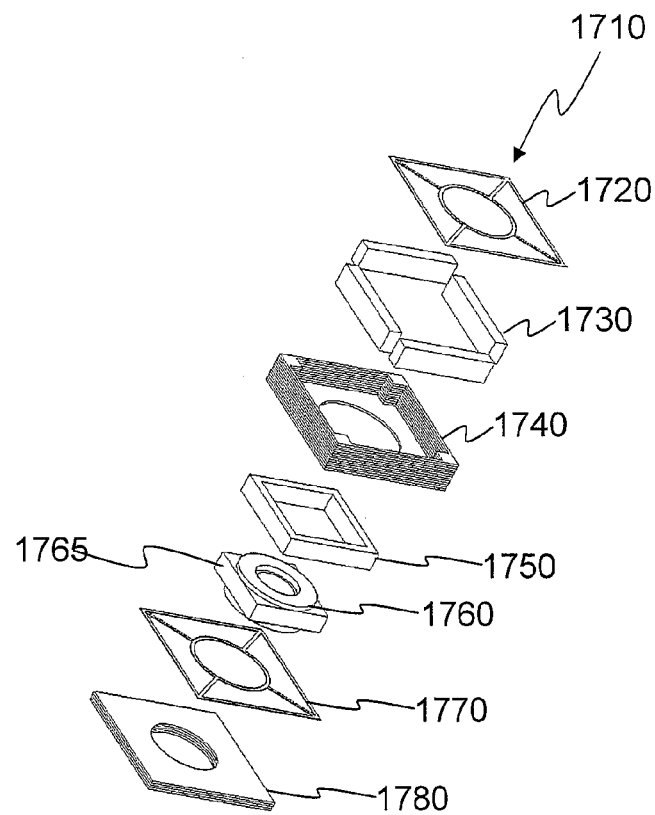
FIG. 17 is a perspective view of components that comprise a compact imaging module, according to yet another embodiment.

FIG. 17 is a perspective view of components that may comprise compact imaging module 1600, according to an embodiment. Such a compact imaging module may comprise an image sensor such as image sensor 105 shown in FIG. 2, for example. Compact imaging module 1600 may further comprise a lens assembly 1760, which may include one or more lenses to project an image onto an image sensor. Aperture 1710 may receive light into lens assembly 1760 and other components of compact imaging module 1600. So that such an image may be focused onto an image sensor, an actuator may adjust a position of lens assembly 1760 with respect to an image sensor. In a particular implementation, such an actuator may adjust a vertical position of at least a portion of lens assembly 1760 with respect to an image sensor. In an implementation, such an actuator may comprise a magnet 1730, a laminated magnet holder 1740, a spring 1720, and/or a coil 1765 (e.g., peripherally disposed on lens assembly 1760). Laminated magnet holder 1740 may comprise a substantially planar holder that provides an area and/or space to accommodate one or more magnets 1730. Such a laminated magnet holder may comprise two or more laminating layers, as described above, for example. Though magnet 1730 is shown in FIG. 17 to include four portions, claimed subject matter is not so limited. Also, a magnet holder, whether laminated or not, need not be included in an embodiment of an imaging module. Imaging module 1600 may further comprise a laminated bottom spacer 1780 disposed between bottom spring 1770 and an image sensor, for example. Of course, such details of compact imaging module are merely examples, and claimed subject matter is not so limited.

Figure 18:
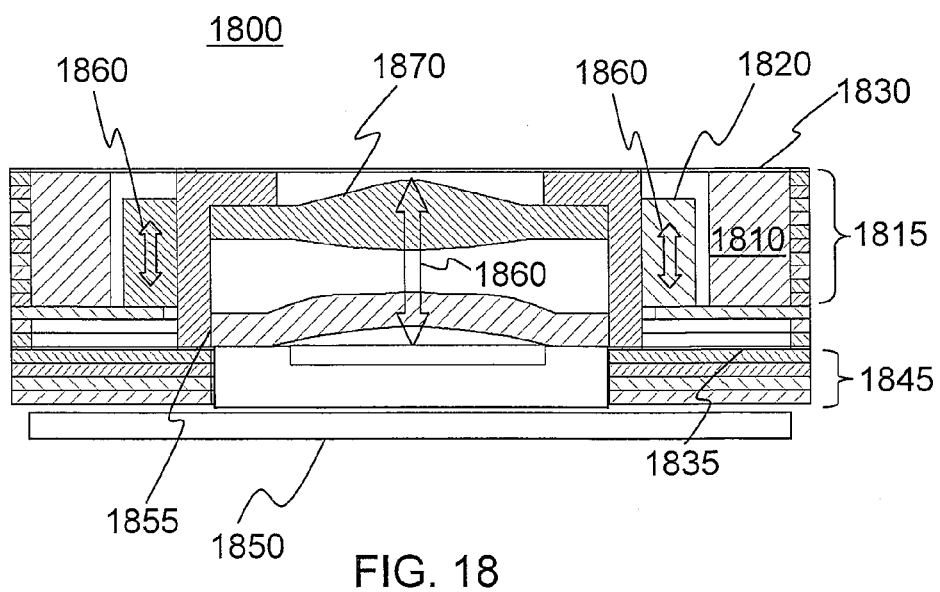
FIG. 18 is a cross-section view of components that comprise a compact imaging module, according to yet another embodiment.

FIG. 18 is a cross-section view of components that comprise a compact imaging module 1800, according to another embodiment. Such a compact imaging module may comprise an image sensor 1850 and a lens assembly 1870 to project an image onto image sensor 1850. An actuator may adjust a position of lens assembly 1870 with respect to image sensor 1850 to focus an image onto image sensor 1850. A direction of such positioning is depicted by arrow 1860, for example. As mentioned above, lens assembly 1870 may comprise one or more lenses, and the vertical position of one or more such lenses may be adjusted as a group by an actuator. In an implementation, such an actuator may comprise a magnet 1810, a laminated magnet holder 1815, a planar top spring 1830, and/or a coil 1820, which may be attached circumferentially around lens assembly 1870. Laminated magnet holder 1815 may comprise a substantially planar holder that provides an area and/or space to accommodate one or more magnets 1810. Such a laminated magnet holder may comprise two or more laminating layers, as described above, for example. Responsive to actuator movements, coil 1820 may move with lens assembly 1870 substantially in a direction indicated by arrows 1860. In a particular implementation, bottom planar spring 1835 may comprise a portion attached to a portion of lens assembly 1870. Another portion of bottom planar spring 1835 may be attached to a portion of spacer 1845 to form a movable part. Of course, such details of compact imaging module 1800 are merely examples, and claimed subject matter is not so limited.

Figure 19:
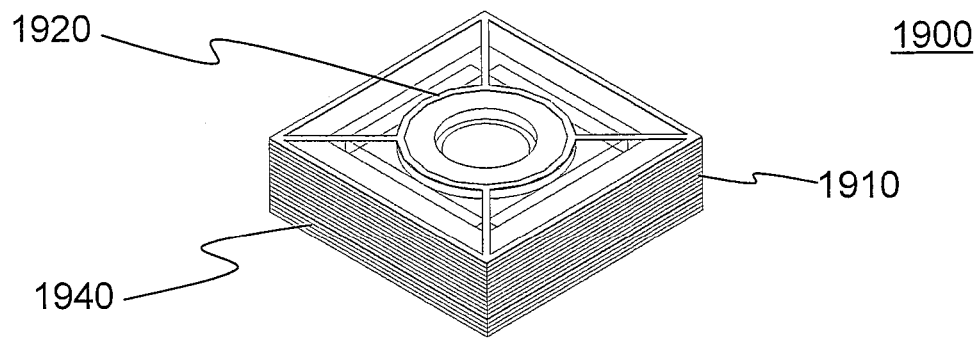
FIG. 19 is a perspective view of a compact imaging module, according to still another embodiment.

FIG. 19 is a perspective view of a compact imaging module 1900, according to another embodiment. Such a compact imaging module may comprise a laminated coil holder 1910 and a laminated bottom spacer 1940. Aperture 1920 may receive light into lens assembly 2030 (FIG. 20).

Figure 20:
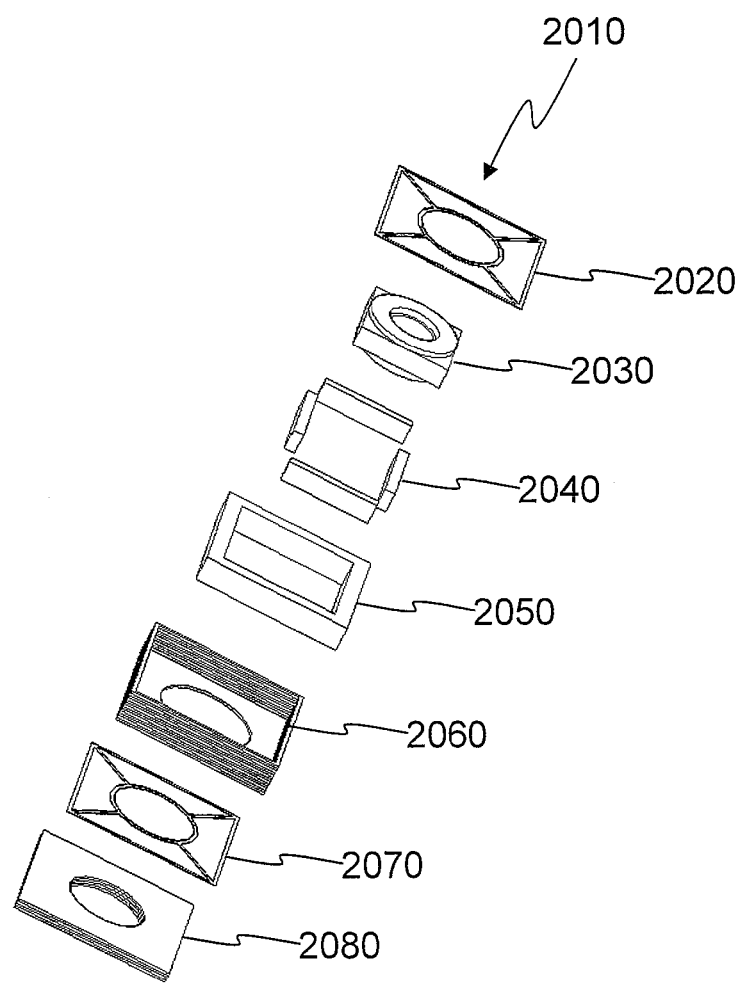
FIG. 20 is a perspective view of components that comprise a compact imaging module, according to still another embodiment.

FIG. 20 is a perspective view of components that may comprise compact imaging module 1900, according to an embodiment. Such a compact imaging module may comprise an image sensor such as image sensor 105 shown in FIG. 2, for example. Compact imaging module 1900 may further comprise a lens assembly 2030, which may include one or more lenses to project an image onto an image sensor. Aperture 2010 may receive light into lens assembly 2030 and other components of compact imaging module 1900. So that such an image may be focused onto an image sensor, an actuator may adjust a position of lens assembly 2030 with respect to an image sensor. In a particular implementation, such an actuator may adjust a vertical position of at least a portion of lens assembly 2030 with respect to an image sensor. In an implementation, such an actuator may comprise a magnet 2040, a coil 2050, a laminated coil holder 2060, and/or a spring 2020. Laminated coil holder 2060 may comprise a substantially planar holder that provides an area and/or space to accommodate one or more coils 2050. Such a laminated coil holder may comprise two or more laminating layers, as described above, for example. Though magnet 2040 is shown in FIG. 20 to include four portions, claimed subject matter is not so limited. Also, a coil holder, whether laminated or not, need not be included in an embodiment of an imaging module. Imaging module 1900 may further comprise a laminated bottom spacer 2080 disposed between bottom spring 2070 and an image sensor, for example. Of course, such details of compact imaging module are merely examples, and claimed subject matter is not so limited.

Figure 21:
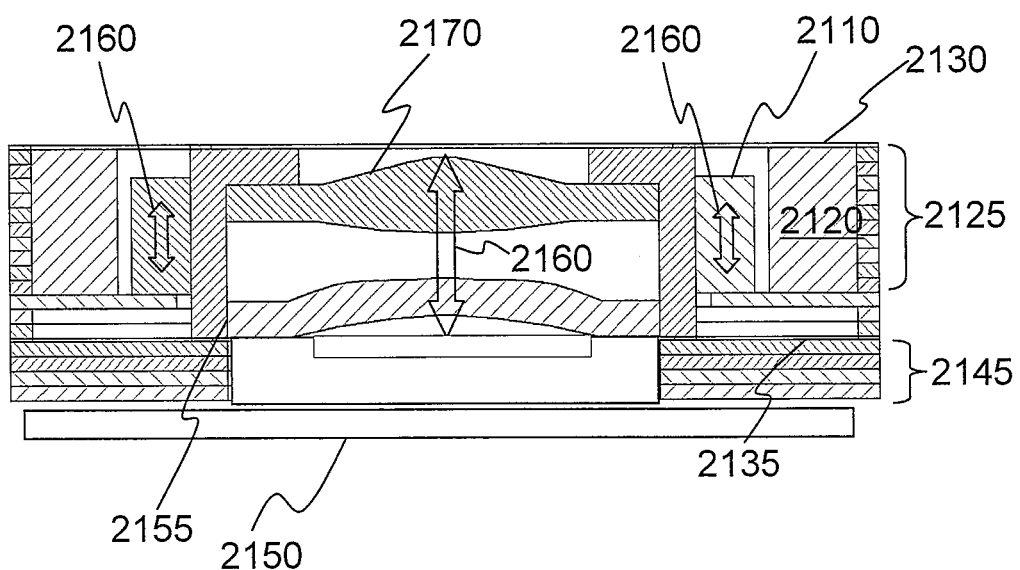
FIG. 21 is a cross-section view of components that comprise a compact imaging module, according to still another embodiment.

FIG. 21 is a cross-section view of components that comprise a compact imaging module 2100, according to another embodiment. Such a compact imaging module may comprise an image sensor 2150 and a lens assembly 2170 to project an image onto image sensor 2150. An actuator may adjust a position of lens assembly 2170 with respect to image sensor 2150 to focus an image onto image sensor 2150. A direction of such positioning is depicted by arrow 2160, for example. As mentioned above, lens assembly 2170 may comprise one or more lenses, and the vertical position of one or more such lenses may be adjusted as a group by an actuator. In an implementation, such an actuator may comprise a magnet 2110, a planar top spring 2130, a coil 2120, and/or a laminated coil holder 2125. Laminated coil holder 2125 may comprise a substantially planar holder that provides an area and/or space to accommodate one or more coils 2120. Such a laminated coil holder may comprise two or more laminating layers, as described above, for example. Responsive to actuator movements, coil 2120 may move with lens assembly 2170 substantially in a direction indicated by arrows 2160. In a particular implementation, bottom planar spring 2135 may comprise a portion attached to a portion of lens assembly 2170. Another portion of bottom planar spring 2135 may be attached to a portion of spacer 2135 to form a movable part. Of course, such details of compact imaging module 2100 are merely examples, and claimed subject matter is not so limited.

While there has been illustrated and described what are presently considered to be example embodiments, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular embodiments disclosed, but that such claimed subject matter may also include all embodiments falling within the scope of the appended claims, and equivalents thereof.

What is claimed is:

1. An optical apparatus comprising:
a lens assembly including one or more lenses;
an image sensor to receive light from said lens assembly; and
an actuator to adjust a position of said lens assembly, said actuator including at least one magnet and at least one coil to produce an electromagnetic force, wherein at least a portion of said actuator or at least a portion of an actuator support comprise at least one laminated component, and wherein said at least one laminated component comprises a laminated magnet holder to support said at least one magnet.

2. The optical apparatus of claim 1, wherein said at least one laminated component comprises two or more metal sheets laminated to one another.

3. The optical apparatus of claim 1, wherein said at least one laminated component comprises two or more material sheets laminated to one another, wherein said two or more material sheets have patterns different from one another.

4. The optical apparatus of claim 1, wherein said at least one laminated component comprises two or more material sheets laminated to one another, wherein said two or more material sheets have thicknesses different from one another.

5. The optical apparatus of claim 1, wherein said laminated magnet holder is fixed with respect to said image sensor and is separated from said lens assembly by said at least one coil.

6. The optical apparatus of claim 1, wherein said at least one laminated component comprises one or more of a first material sheet comprising a first material and one or more of a second material sheet comprising a second material, wherein said first material is different than said second material.

7. The optical apparatus of claim 1, wherein said at least one laminated component comprises two or more fiberglass, plastic, and/or ceramic sheets laminated to one another.

8. The optical apparatus of claim 1, wherein said at least one laminated component comprises two or more sheets having varying patterns laminated to one another to form a notch.

* * * * *